United States Patent
Sridhar et al.

(10) Patent No.: US 9,587,054 B2
(45) Date of Patent: Mar. 7, 2017

(54) HIGH MOLECULAR WEIGHT POLYMERS HAVING HIGH OLEFIN CONTENT

(71) Applicant: Henkel IP & Holding GmbH, Duesseldorf (DE)

(72) Inventors: Laxmisha Sridhar, Monmouth Junction, NJ (US); Smita Shah, Edison, NJ (US); John G. Woods, Farmington, CT (US); Anthony F. Jacobine, North Haverhill, NH (US); Jiangbo Ouyang, Clarksburg, MD (US); Austin Sloan, Bayonne, NJ (US); Swapnali Chaudhari, New Providence, NJ (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/017,685

(22) Filed: Feb. 8, 2016

(65) Prior Publication Data
US 2016/0152746 A1    Jun. 2, 2016

Related U.S. Application Data

(63) Continuation of application No. PCT/CN2013/082081, filed on Aug. 22, 2013.

(51) Int. Cl.
| | |
|---|---|
| C08F 4/44 | (2006.01) |
| C08F 4/52 | (2006.01) |
| C08F 12/24 | (2006.01) |
| C08F 18/16 | (2006.01) |
| C08F 220/10 | (2006.01) |
| C08F 210/14 | (2006.01) |
| C08F 4/06 | (2006.01) |
| C08F 4/12 | (2006.01) |
| C08F 210/08 | (2006.01) |
| C08F 210/10 | (2006.01) |

(52) U.S. Cl.
CPC ............. *C08F 210/14* (2013.01); *C08F 4/06* (2013.01); *C08F 4/12* (2013.01); *C08F 210/08* (2013.01); *C08F 210/10* (2013.01)

(58) Field of Classification Search
CPC .. C08F 4/06; C08F 4/12; C08F 210/14; C08F 210/10; C08F 210/08; C08F 220/14; C08F 2220/301; C08F 2220/185; C08F 2220/302
USPC .......................... 526/184, 185, 313, 326, 329
See application file for complete search history.

(56) References Cited

U.S. PATENT DOCUMENTS

| | | | |
|---|---|---|---|
| 3,461,108 A | 8/1969 | Heilman et al. | |
| 4,048,422 A | 9/1977 | Sackmann et al. | |
| 4,165,340 A * | 8/1979 | Tohzuka | B01J 37/28 568/399 |
| 6,677,422 B2 | 1/2004 | Coca et al. | |
| 7,884,161 B2 * | 2/2011 | Jung | C08F 220/14 526/100 |
| 7,943,709 B2 | 5/2011 | Jeon et al. | |
| 2009/0018298 A1 | 1/2009 | Michl et al. | |
| 2010/0280198 A1 | 11/2010 | Bartley et al. | |

FOREIGN PATENT DOCUMENTS

| | | |
|---|---|---|
| CN | 100368450 | 2/2008 |
| CN | 101421322 | 4/2009 |
| CN | 101679565 | 3/2010 |
| EP | 1964862 | 9/2008 |
| KR | 20090066627 | 6/2009 |

OTHER PUBLICATIONS

S. Meckling et al, "Mechanistic Studies of the Palladium-Catalyzed Copolymerization of Ethylene and a-Olefins with Methyl Acrylate", J. Am. Chem. Soc. 1998, 120, 888.
E. Drent et al, "Palladium catalysed copolymerisation of ethene with alkylacrylates: polar comonomer built into the linear polymer chain", Chem. Comm. 2002, 744.
G. Tian et al, "Neutral Palladium Complexes as Catalysts for Olefin-Methyl Acrylate Copolymerization: A Cautionary Tale", Macromolecules 2001, 34, 7656.
K. Tanaka et al, "Copolymerization of (Meth)acrylates with Olefins Using Activators Regenerated by Electron Transfer for Atom Transfer Radical Polymerization (ARGET ATRP)", Macromol. Symp. 2008, 261, 1, 1-9.
Y. Chen et al, Effect of Lewis Acids on Reactivity Ratios for (Meth)acrylate/Nonpolar Alkene Copolymerizations:, Macromolecules, 2009, 42. 3951.
R. Venkatesh et al, "Olefin copolymerization via Controlled Radical Polymerization: Copolymerization of Methyl Methacrylate and 1-OcteneMacromolecules", 2004, 37, 1226.
H. Mei et al, "Radical Copolymerization of Isobutylene and Ethyl Acrylate with LiCB11Me12 Catalyst", Macromolecules, 2011, 44 2552-2558.
Florjanczyk et al., "Copolymerization of Methyl Acrylate with Isobutylene in the Presence of Lewis Acids", Makromol. Chem. 1982, 183, 1081-1091.
International Search Report issued in connection with International Patent Application No. PCT/CN2013/082081 mailed on May 20, 2014.
Johnson et al, "Copolymerization of Ethylene and Propylene with Functionalized Vinyl Monomers by Palladium(II) Catalysts", J. Am. Chem. Soc. 1996, 118, 267-268.

* cited by examiner

*Primary Examiner* — William Cheung
(74) *Attorney, Agent, or Firm* — Steven C. Bauman

(57) ABSTRACT

The present invention discloses polymers prepared from polar vinyl monomers and non-polar olefin monomers with the polymers having high olefin content and high weight average molecular weights as well as methods of preparing them. The inventive polymers possess interesting properties that make them particularly attractive in several industrial applications.

30 Claims, No Drawings

HIGH MOLECULAR WEIGHT POLYMERS HAVING HIGH OLEFIN CONTENT

FIELD OF THE INVENTION

The present invention relates to polymers from polar vinyl monomers (or activated olefins) and non-polar olefin monomers (or non-activated olefins) with the polymers having high olefin content and high weight average molecular weights and methods of preparing them. This invention also discloses polymers from polar vinyl monomers and non-polar olefin monomers with the polymers having high olefin content and high weight average molecular weights and methods of preparing them, wherein said polymers contain additional crosslinkable functionalities. The inventive polymers possess interesting properties that make them particularly attractive in several industrial applications.

BACKGROUND OF THE INVENTION

Copolymers of polar vinyl monomers and non-polar alkene monomers, especially non-polar 1-alkene monomers, have been the subject of research for a long time because the properties of the copolymer can be controlled by combining the very different properties of the starting monomers making them attractive materials for a number of applications. A number of methods have been reported for the copolymerization of acrylates with non-activated olefins. See, for example, S. Meckling et al, *J. Am. Chem. Soc.* 1998, 120, 888; E. Drent et al, *Chem. Comm.* 2002, 744; G. Tian et al, *Macromolecules* 2001, 34, 7656; K. Tanaka et al, *Macromol. Symp.* 2008, 261, 1; Y. Chen et al, *Macromolecules*, 2009, 42, 3951; S. L. Bartley, et al, U.S. 2010/0280198; U.S. Pat. No. 3,461,108; R. Venkatesh et al, *Macromolecules,* 2004, 37, 1226; H. Mei et al, *Macromolecules,* 2011, 44, 2552; and C. Wang et al, *Organometallics,* 1998, 17, 3149, for some discussions. Also of interest are U.S. Pat. Nos. 6,677,422; 7,884,161; and 4,048,422; EP 1964862; and publications U.S. 2010/0280198 and US2009/0018298.

One approach involves coordination polymerization catalyzed by transition and late transition metals, which appear to be effective for ethylene and α-olefins but polar acrylic monomers generally deteriorate the metal catalysis resulting in the copolymerization being inhibited. This method gives copolymers high in acrylate and low in the olefin content. Another reported approach involves radical copolymerization in the presence of Lewis acids. See the above-shown Y. Chen et al and K. Venkatesh et al. Use of strong Lewis acids was found to be necessary for enhancing the efficiency of copolymerization. However, obtaining copolymers and terpolymers which contain both high molecular weight with high olefin content has been generally difficult. Any success has been successful only with lower olefins such as ethylene and propylene, which too required high pressure conditions.

It would be an advantage to have a convenient process to prepare polymers (such as copolymers, terpolymers and the like) in high molecular weights and with high olefin content.

It would be an additional advantage if the process is economical and possible to be carried out with conventional equipment.

It would be a further advantage if the process is applicable to be used not only with lower olefins such as ethylene and propylene but also with higher olefins such as 1-hexene, 1-octene and the like.

It would be a still additional advantage if the polymers contain crosslinkable functionalities that can be used to further react said polymers with other desired reactants. If would be a further advantage if the process is flexible enough to introduce such crosslinkable functionalities during the polymerization reaction or even after the polymerization reaction by further reacting the polymers.

SUMMARY OF THE INVENTION

In one embodiment, the present invention provides polymers of high molecular weight and high olefin content from one or more activated olefins and one or more non-activated olefins and a process to prepare them. The term "high molecular weight" herein generally refers to weight average molecular weights ($M_w$) of at least about 50,000, specifically from about 100,000 to about 3.0 million, and more specifically from about 200,000 to about 2.0 million and still more specifically from about 500,000 to about 1.5 million. The term "high olefin content" herein generally refers to the olefin content (from non-activated olefin) of at least about 30%, specifically at least about 40%, more specifically about 50% and still more specifically at least about 50%.

In another embodiment, the present invention discloses a process to prepare a polymer with weight average molecular weight in the range 50,000-3.0 million, wherein said polymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamide, wherein said one or more non-activated olefins constitutes at least 30% of the polymer, said method comprising the steps of:

(a) preparing a solution containing said one or more of activated olefins and said one or more non-activated olefins, optionally in the presence of a solvent;

(b) precomplexing equimolar amounts of said one or more of activated olefins and a Lewis acid to form a mix and adding the mix to the solution in (a) to form a mixture;

(c) optionally adding a radical initiator; and (d) polymerizing said mixture at temperatures of about −78° C. to about 80° C. for a time sufficient to obtain the desired polymer.

In another embodiment, the present invention discloses a process to prepare a copolymer with weight average molecular weight in the range 50,000-3.0 million, wherein said copolymer comprises, in its repeat unit, (i) an activated olefin independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) a non-activated olefin independently selected from the group consisting of an unsubstituted alkene, monosubstituted alkene, disubstituted alkene, trisubstituted alkene, allyl ether, allyl ester, allyl sulphide and allylamide, wherein said non-activated olefin constitutes at least 30% of the polymer, said method comprising the steps of:

(a) preparing a solution containing said activated olefin and said non-activated olefin, optionally in the presence of a solvent;

(b) precomplexing equimolar amounts of said activated olefins and a Lewis acid to form a mix and adding the mix to the solution in (a) to form a mixture;

(c) optionally adding a radical initiator; and (d) polymerizing said mixture at temperatures of about −78° C. to about 80° C. for a time sufficient to obtain the desired copolymer.

In yet another embodiment, the present invention discloses a process to prepare a terpolymer with weight average molecular weight in the range 50,000-3.0 million, wherein said terpolymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamide, wherein said one or more non-activated olefins constitutes at least 30% of the terpolymer, said method comprising the steps of:

(a) preparing a solution containing said one or more of activated olefins and said one or more non-activated olefins, optionally in the presence of a solvent;

(b) precomplexing equimolar amounts of said one or more of activated olefins and a Lewis acid to the solution to form a mix and adding the mix to the solution in (a) to form a mixture;

(c) optionally adding a radical initiator; and (d) polymerizing said mixture at temperatures of about −78° C. to about 80° C. for a time sufficient to obtain the desired terpolymer.

In most of the instant polymerization reactions, high pressures were not found necessary. The reactions could be performed efficiently at atmospheric pressures. In most of the instant polymerization reactions, conventional polymerization equipment was found sufficient.

A free radical initiator was not always necessary in the polymerization reactions. While free radical initiators could be used, several of the reactions could be performed with substantially equal efficiency and equally desirable results without a free radical initiator.

It was also found that precomplexing of the Lewis acid with the activated olefin was not always necessary for the polymerization reaction to proceed equally efficiently to yield the desired polymer in desired yields and with desired high olefin content and high molecular weights. In such instances, the embodiments described herein for the precomplexing reaction are equally applicable to the non-precomplexing reaction. Thus, in another embodiment, the present invention discloses a process to prepare a polymer with weight average molecular weight in the range 50,000-3.0 million, wherein said polymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamide, wherein said one or more non-activated olefins constitutes at least 30% of the polymer, said method comprising the steps of:

(a) preparing a solution containing said one or more of activated olefins and said one or more non-activated olefins, optionally in the presence of a solvent;

(b) adding a Lewis acid to the solution to form a mixture;

(c) optionally adding a radical initiator; and (d) polymerizing said mixture at temperatures of about −78° C. to about 80° C. for a time sufficient to obtain the desired polymer.

In another embodiment, the present invention discloses polymer compositions (such as, for example, copolymers, terpolymers and the like) with high molecular weight and high olefin content prepared by the inventive process.

In yet another embodiment, the present invention discloses polymers (such as, for example, copolymers, terpolymers and the like) with high molecular weight and high olefin content) containing crosslinkable functionalities. The crosslinkable functionalities are advantageous that they can be converted into products with useful applications. Non-limiting examples of such applications include adhesives, elastomers, tougheners, polymeric photoinitiators and the like. The crosslinkable functionalities can be present in the polymers as they are prepared or they can be introduced into the polymer by further reacting the polymer with suitable reactants.

In still another embodiment, the present invention discloses articles and materials comprising the inventive polymers discussed above.

DETAILED DESCRIPTION OF THE INVENTION

For purpose of this present invention, the following definitions will apply:

The terms "(meth)acrylate" or "(meth)acryloxy" will include methacrylate and acrylate and methacryloxy and acryloxy, respectively, as applicable.

The terms "halogen", "halo", or "hal" when used alone or part of another group mean chlorine, fluorine, bromine or iodine.

In an embodiment, the present invention discloses a process to prepare a polymer with weight average molecular weight in the range 50,000-3.0 million, wherein said polymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamide, wherein said one or more non-activated olefins constitutes at least 30% of the polymer, said method comprising the steps of:

(a) preparing a solution containing said one or more of activated olefins and said one or more non-activated olefins, optionally in the presence of a solvent;

(b) precomplexing equimolar amounts of said one or more of activated olefins and a Lewis acid to form a mix and adding the mix to the solution in (a) to form a mixture;

(c) optionally adding a radical initiator; and (d) polymerizing said mixture at temperatures of about −78° C. to about 80° C. for a time sufficient to obtain the desired polymer.

In another embodiment, the activated olefin is a (meth)acrylate wherein said (meth)acrylate is represented by the formula $H_2C=C(G)CO_2R_1$, where G may be hydrogen, halogen or alkyl of 1 to 6 carbon atoms, and $R_1$ may be selected from alkyl, cycloalkyl, alkenyl, cycloalkenyl, alkaryl, aralkyl or aryl groups of 1 to 16 carbon atoms, any of which may be optionally substituted or interrupted as the case may be with the moiety selected from the group consisting of silane, silicon, oxygen, halogen, carbonyl, hydroxyl, ester, carboxylic acid, urea, urethane, carbamate, amine, amide, sulfur, sulfonate and sulfone and combinations thereof.

Non-limiting examples of suitable (meth)acrylates are methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate, cyclohexyl(meth)acrylate, isobornyl(meth)acrylate, benzyl(meth)acrylate, 2-hydroxy(meth)acrylate, trimethoxybutyl(meth)acrylate, ethylcarbitol(meth)acrylate, phenoxyethyl(meth)acrylate, 2-hydroxyethyl(meth)acrylate, trimethylolpropanetri(meth)acrylate, tetramethylolmethane tetra(meth)acrylate, pentaerythritol hexa(meth)acrylate, pentaerythritol tetra(meth)acrylate, dipentaerythritol monohydroxy penta(meth)acrylate, dipentaerythritol hexa(meth)acrylate, 1,4-butyleneglycol di(meth)acrylate, 1,6-hexanediol di(meth)acrylate, polyethyleneglycol di(meth)acrylate and oligoester(meth)acrylate.

In one particularly useful aspect of the invention, the (meth)acrylate is methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate or cyclohexyl(meth)acrylate.

The non-activated olefin is selected from the group consisting of an unsubstituted alkene, a monosubstituted alkene, a disubstituted alkene and a trisubstituted alkene.

Non-limiting examples of suitable non-activated olefins are ethylene, propylene, 1-butene, 1-pentene, 1-hexene, 1-heptene, 1-octene, 1-nonene, 2-methyl-pentene, 3-methyl-1-butene, isobutylene, diisobutylene, 2-methyl-1-pentene, 3-methyl-1-pentene, 4-methyl-1-pentene, 1,1-dimethylpentene, vinylcyclohexane, cyclopropene, cyclobutene, cyclopentene, cyclohexene, norbornene, limonene, α-pinene, β-pinene, camphene, cis-cyclooctene and trans-cyclooctene.

In one particularly useful aspect of the invention, the non-activated olefin is selected from ethylene, propylene, 1-butene, 1-pentene, 1-hexene, 1-heptene, 1-octene, 2-methylpentene, 3-methyl-1-butene, isobutylene or diisobutylene.

In one particularly useful aspect of the invention, the activated olefin is selected from methyl acrylate or n-butyl acrylate, and the non-activated olefin is selected from 2-methylpentene, isobutylene or 1-octene.

A solvent is generally not necessary for the reaction to proceed if the reactants are liquid and soluble enough in each other as well as to dissolve the catalyst sufficiently for the reaction to proceed. However, if a solvent is desired, suitable solvent may be selected from a hydrocarbon, halogenated hydrocarbon, alkyl ester (e.g. ethyl acetate, butyl acetate and the like) or mixtures thereof. Non-limiting examples of suitable solvents are toluene, xylene, benzene, n-hexane, n-heptane, chlorobenzene, methylene chloride, 1,2-dichloroethane, cyclohexane, methyl cyclohexane and mixtures thereof. A particularly preferred solvent is toluene.

The reaction is performed in the presence of a Lewis acid catalyst. Non-limiting examples of suitable Lewis acids include $EtAlCl_2$, ethyl aluminum sesquichloride, $ZnCl_2$, $AlCl_3$, $AlBr_3$, $BF_3$, $TiCl_4$ and combinations thereof. The choice of the Lewis acid depends on any solvent selected for the reaction since solubility of the Lewis acid in that particular solvent should be taken into consideration. A particularly preferred Lewis acid is $EtAlCl_2$.

The activated olefin and the Lewis acid catalyst are ideally precomplexed to form a mix prior to the addition of the copolymerization reactant mixture.

A free radical initiator is not always necessary for the polymerization reaction to proceed. Thus, it was found that the polymerization reaction could be performed with an initiator as well as without initiator to satisfactory and desired yields, conversion and molecular weights. If an initiator is used, suitable radical initiators may be selected from the group consisting of benzoyl peroxide, methyl ethyl ketone peroxides, di-t-butyl peroxide, di-t-amyl peroxide, dicumyl peroxide, diacyl peroxide, decanoyl peroxide, lauroyl peroxide, 2,4-dichlorobenzoyl peroxide, t-butyl perbenzoate, cumene hydroperoxide (CHP), 2,5-bis(t-butylperoxy) 2,5-dimethylhexane, peroxydicarbonates, peroxyesters, dialkyl peroxides, hydroperoxide, peroxyketals, 4,4'-azobis (4-cyanovaleric acid), 1,1'-azobis(cyclohexanecarbonitrile), 2,2'-azobisisobutyronitrile ("AIBN"), and mixtures thereof. A particularly preferred initiator in such cases is benzoyl peroxide. Free radical initiators may be incorporated in any amounts useful to achieve the desired reaction or cure. Desirably, they are present in amounts of about 0.01% to about 10% by weight of the total composition. Combinations of the free-radical initiators are also useful.

The reaction temperature and duration may be selected as is suitable or sufficient to obtain the desired polymer in desired yields. Reaction temperatures, for example, may range generally from about −78° C. to about 80° C., specifically from about −78° C. to about 40° C. and more specifically from about −78° C. to about the room temperature ("RT").

In an illustrative process of the invention, methyl acrylate ("MA", 1 eq) and isobutylene ("IB", 10 eq) were reacted in the presence of benzoyl peroxide ("BPO", 0.01 eq) as radical initiator and $EtAlCl_2$ (0.2 eq) as Lewis acid in toluene solvent. The Lewis acid was complexed with equimolar amount of the acrylate prior to the addition of the copolymerization mixture. Several runs were performed and the copolymers in the molecular weight range 500,000-1.5 million were obtained (Table 1, entries 1 and 2). Higher molecular weights copolymers were also obtained even with higher alkene such as 1-octene (entry 3). 1,1-Disubstituted alkene such as 2-methyl pentene also gave higher molecular weight copolymer under similar conditions (entry 4). These results established that high molecular weight copolymers with high olefin content can be obtained under low temperature conditions in the presence of Lewis acids. The excess olefin can be distilled and recycled to make the process more economical.

TABLE 1

Copolymerization study of olefins (10 eq) and acrylates (1 eq) in the presence of 0.01 eq of BPO and 0.2 eq of $EtAlCl_2$ in toluene

| Entry | Acrylate | Olefin | Mol. wt. Range | Acrylate:Olefin ratio |
|---|---|---|---|---|
| 1 | MA | Isobutylene | 500,000-1.5 million | ~1:1 |
| 2 | n-BA | isobutylene | 500,000-1.5 million | ~1:1 |
| 3 | n-BA | 1-Octene | 200,000-400,000 | ~1:1 |
| 4 | n-BA | 2-methyl pentene | ~250,000 | ~1:1 |

Table 2 lists the properties (e.g. mol. weights) of several other polymers prepared by the process of the invention, demonstrating the flexibility of the process as well as the feasibility to produce polymers with tailor-made properties by adjusting the reaction conditions suitably.

TABLE 2

| Entry | Acrylate | Non-activated Olefin | Temp. | Solvent | Initiator | Lewis acid(eq)/initiator (eq) | Mol. Wt. |
|---|---|---|---|---|---|---|---|
| 1 | n-BA | 2-methylpentene | RT | Toluene | BPO | 0.2/0.01 | 90,000 |
| 2 | n-BA | 2-methylpentene | −40° C. | Toluene | BPO | 0.2/0.01 | 242,000 |
| 3 | n-BA | 1-Octene | RT | Toluene | BPO | 0.2/0.01 | 183,000 |
| 4 | n-BA | 1-Octene | −40° C. | none | BPO | 0.2/0.01 | 340,000 |
| 5 | MA | 1-Octene | RT | Toluene | BPO | 0.2/0.01 | 127,634 |
| 6 | MA | 1-Octene | −40° C. | toluene | BPO | 0.2/0.01 | 304,512 |
| 7 | n-BA | 1-Octene | −40° C. | None | BPO | 0.4/0.02 | 260,000 |
| 8 | n-BA | 1-Octene | −40° C. | Toluene | BPO | 0.4/0.02 | 150,000 |
| 9 | n-BA | 1-Octene | −40° C. | None | BPO | 0.2/0.01 | 580,000 |
| 10 | n-BA | 1-Octene | −40° C. | Toluene | BPO | 0.2/0.01 | 236,000 |

Characterization $^1$H and $^{13}$C NMR spectral techniques were used to establish % of alkene and acrylate present in the copolymer. The data indicated that all of these copolymers contained olefins and acrylates in approximately 1:1 ratio. A copolymerization experiment was performed by lowering the 1-octene reactant ratio from 10:1 to 4:1 with respect to acrylate. However, this did not appear to affect the 1-octene content in the copolymer significantly. GC/pyrolysis data of several copolymers indicated mostly alternating type sequence of alkene and acrylate in the copolymer. Alkene-acrylate dimeric and trimeric fragments appeared in the GC pyrolysis spectrum, which indicated mostly alternating type of sequence. The polymers obtained by the inventive process had high weight average molecular weights. Weight average molecular weights of about 50,000 to about 3.0 million could be routinely obtained in the polymers.

The reaction lends itself to the preparation of copolymers, terpolymers and the like with equal ease. Several such reactions are described in more detail in the Examples section. Functionalized polymers could be prepared as well. Polymers with suitable functionalities could be prepared. Non-limiting examples of such functionalities include functional groups such as epoxy, carboxylic acid, hydroxy, thiol, amide, oxazoline, acetoacetate, isocyanate, carbamate, aceto, amine, amine salt, quaternized amine, thioether, sulfide, sulfonium salt, acetophenone, acyl phosphine oxide, thioxanthone, benzoin ether, benzyl ketal, siloxy, cyano, cyanoacrylate, cyanoacetate, alkyl ether, reactive silanes such as alkoxy silanes, e.g., tetramethoxysilane, epoxyether and vinyl ether and combinations thereof. The functional groups could be introduced by processes such as, for example, starting with a functional group-containing monomer as a reactant or preparing a non-functionalized polymer which is further reacted with suitable reagents to introduce the functional groups. Creating functional ends on the polymer may also be done by performing an end-capping reaction. For example, these groups may be added to one or more of the terminal ends of the inventive resin via reaction with compounds containing these functionalities.

In another embodiment, the present invention includes reaction products (polymers) formed by the inventive process described above. Thus, in an embodiment, the invention provides a reaction product prepared by a Lewis acid-catalyzed copolymerization reaction, wherein said product comprises, in its repeat unit, one or more activated olefins and at least 30% content of one or more non-activated olefins, and has a weight average molecular weight in the range 50,000-3.0 million, wherein said one or more activated olefins are independently selected from the group consisting of a (meth)acrylate, acrylonitrile, (meth)acrylamide, maleimide, itaconimide, citroconimide, maleic anhydride, cyanoacrylate, maleate, fumarate, crotonate, cinnamate and alkylidene malonate, and said one or more non-activated olefins are independently selected from the group consisting of an unsubstituted alkene, monosubstituted alkene, disubstituted alkene, trisubstituted alkene, allyl ether, allyl ester, allyl sulfide and allyl amide.

The reaction product can be a copolymer, terpolymer and the like. The copolymer, terpolymer and the like may also comprise one or more crosslinkable functionalities such as, for example, those described above.

In yet another embodiment, the present invention includes materials or articles formed using the reaction products of the invention. Non-limiting examples of such materials and articles include an adhesive, an elastomer, a toughener for a cyanoacrylate and/or epoxy, a polymeric photoinitiator or a personal care product.

The present invention is further described by the Examples shown below. The Examples are provided for illustrative purposes only and are not to be considered as limiting the scope of the invention or the claims in any way.

EXAMPLES

Example 1

Synthesis of Methyl Acrylate (MA) and Isobutylene Copolymer

In a 500 mL 4 necked round bottom flask equipped with a stainless steel stirrer with banana shaped blade, thermometer, cold finger condenser, nitrogen inlet and a cold finger condenser containing dry ice-acetone bath was taken 65.6 g of toluene. The reaction flask was purged with nitrogen while it was cooled using dry ice-o-xylene cooling mixture. 90 g of isobutylene was transferred to the flask.

In another separate flask 0.43 g of BPO in 13.3 g of methyl acrylate (MA) was dissolved and transferred to the reaction flask.

In a separate flask 2.1 g of MA and 2.4 g toluene were taken in a 100 mL 1 necked round bottom flask. Nitrogen was purged through the flask while it was cooled using an ice bath. 19.5 mL of 25 wt % ethyl aluminum dichloride was added to this flask dropwise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (26 g). The composition was determined by proton NMR and the molecular weight was determined by GPC.

Example 2

Synthesis of n-butyl acrylate/1-Octene Copolymer

In a 500 mL 4 necked round bottom flask equipped with a stainless steel stirrer with banana shaped blade, thermometer, cold finger condenser, nitrogen inlet and a cold finger condenser containing dry ice-acetone bath were taken 40 g of toluene and 40 g of 1-octene. The reaction flask was purged with nitrogen while it was cooled using dry ice-o-xylene cooling mixture.

In a separate flask 86 mg of BPO in 3.66 g of butyl acrylate (BA) was dissolved and transferred to the reaction flask.

In another separate flask 0.91 g of BA and 2 g toluene were taken in a 100 mL 1 necked round bottom flask. Nitrogen was purged through the flask while it was cooled using an ice bath. 3.9 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (8 g). The composition was determined by proton NMR and the molecular weight was determined by GPC.

Example 3

Synthesis of Butyl Acrylate and Isobutylene Copolymer

In a 500 mL 4 necked round bottom flask equipped with a stainless steel stirrer with banana shaped blade, thermometer, cold finger condenser, nitrogen inlet and a cold finger condenser containing dry ice-acetone bath was taken 110.8 g of toluene. The reaction flask was purged with nitrogen while it was cooled using dry ice-o-xylene cooling mixture. 150 g of isobutylene was transferred to the flask.

In a separate flask 0.72 g of BPO in 30.46 g of butyl acrylate (BA) was dissolved and transferred to the reaction flask.

In another separate flask 7.61 g of BA and 8 g toluene were taken in a 100 mL 1 necked round bottom flask. Nitrogen was purged through the flask while it was cooled using an ice bath. 32.54 mL of 25 wt % toluene solution of ethyl aluminum dichloride was added to this flask dropwise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (58.5 g). The composition was determined by proton NMR and the molecular weight was determined by GPC.

Example 4

Synthesis of Butyl Acrylate (BA), Ethyleneglycol Phenylether Acrylate and 1-Octene Terpolymer

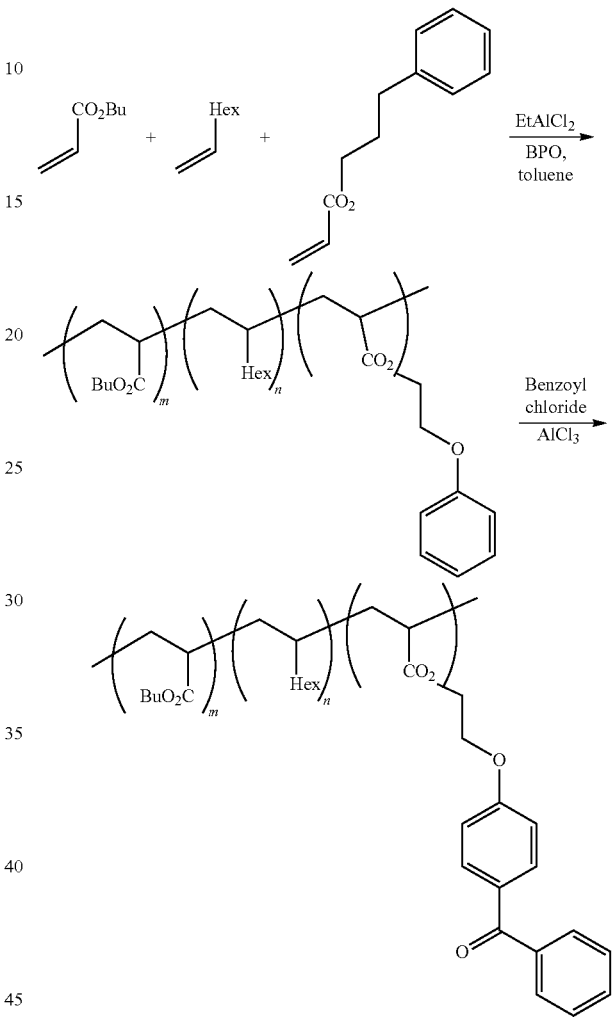

(m and n indicate the amount of each monomer moiety incorporated into the repeat unit of the polymer.)

In a 500 mL 4 necked round bottom flask equipped with a stainless steel stirrer with banana shaped blade, thermometer, cold finger condenser, nitrogen inlet and a cold finger condenser containing dry ice-acetone bath were taken 130 g of toluene and 175 g of 1-octene. The reaction flask was purged with nitrogen while it was cooled using dry ice-o-xylene cooling mixture.

In a separate flask 0.76 g of BPO in 34 g of butyl acrylate (BA) was dissolved and transferred to the reaction flask.

In another separate flask 6 g of BA, 3 g of ethyleneglycol phenyl ether acrylate and 8 g toluene were taken in a 100 mL 1 necked round bottom flask. Nitrogen was purged through the flask while it was cooled using an ice bath. 34.2 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight.

Next day, the reaction was quenched using 20 g of isopropanol. The mixture was transferred to a separatory funnel, washed several times with water, and dried over anhydrous sodium sulfate. After filtering the solvent was evaporated using rotovap to give the terpolymer (crude 67.8 g). The composition was determined by proton NMR and the molecular weight was determined by GPC.

Example 5

Synthesis of Copolymer of Methyl Methacrylate (MMA) and 1-Octene

In a 500 mL 4 necked round bottom flask equipped with a stainless steel stirrer with banana shaped blade, thermometer, cold finger condenser, nitrogen inlet and a cold finger condenser containing dry ice-acetone bath were taken 40 mL of toluene and 56.1 g of 1-octene. The reaction flask was purged with nitrogen while it was cooled using dry ice-o-xylene cooling mixture.

In a separate flask 0.24 g of BPO in 8 g of methyl methacrylate (MMA) was dissolved and transferred to the reaction flask.

In another separate flask 2 g of MMA and 2 mL toluene were taken in a 100 mL 1 necked round bottom flask. Nitrogen was purged through the flask while it was cooled using an ice bath. 11 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (2 g). The composition was determined by proton NMR and the molecular weight was determined by GPC.

Example 6

Synthesis of Butyl Acrylate (BA), Benzylacrylate and 1-Octene Terpolymer

In a 500 mL 4 necked round bottom flask equipped with a stainless steel stirrer with banana shaped blade, thermometer, cold finger condenser, nitrogen inlet and a cold finger condenser containing dry ice-acetone bath were taken 115 g of toluene and 87.6 g of 1-octene. The reaction flask was purged with nitrogen while it was cooled using dry ice-o-xylene cooling mixture.

In a separate flask 0.38 g of BPO in 16 g of butyl acrylate (BA) and 1.27 g of benzyl acrylate was dissolved and transferred to the reaction flask.

In another separate flask 4 g of BA and 5 mL toluene were taken in a 100 mL 1 necked round bottom flask. Nitrogen was purged through the flask while it was cooled using an ice bath. 17.1 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the terpolymer (36.9 g, crude). The composition was determined by proton NMR and the molecular weight was determined by GPC.

Example 7

Synthesis of Butyl Acrylate (BA) and Diisobutylene Copolymer

In a 500 mL 4 necked round bottom flask equipped with a stainless steel stirrer with banana shaped blade, thermometer, cold finger condenser, nitrogen inlet and a cold finger condenser containing dry ice-acetone bath was taken 80 g of toluene and 87.6 g of diisobutylene. The reaction flask was purged with nitrogen while it was cooled using dry ice-o-xylene cooling mixture.

In another separate flask 0.38 g of BPO in 20 g of butyl acrylate (BA) was dissolved and transferred to the reaction flask.

In a separate flask 4 g of BA and 4 mL of toluene were taken in a 100 mL 1 necked round bottom flask. Nitrogen was purged through the flask while it was cooled using an ice bath. 17.1 mL of 25 wt % ethyl aluminum dichloride was added to this flask dropwise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (26.6 g, crude). The composition was determined by proton NMR and the molecular weight was determined by GPC.

Example 8

Synthesis of butyl acrylate (BA), 4[2-acryloxyethoxy]benzophenone and 1-Octene Terpolymer In a 500 mL 4 necked round bottom flask equipped with a stainless steel stirrer with banana shaped blade, thermometer, cold finger condenser, nitrogen inlet and a cold finger condenser containing dry ice-acetone bath were taken 40 g of toluene and 40 g of 1-octene. The reaction flask was purged with nitrogen while it was cooled using dry ice-o-xylene cooling mixture.

In a separate flask 0.17 g of BPO in 7.34 g of butyl acrylate (BA) was dissolved and transferred to the reaction flask.

In another separate flask 1.34 g of BA, 1.05 g of 4[2-acryloxyethoxy]benzophenone and 2 g toluene were taken in a 100 mL 1 necked round bottom flask. Nitrogen was purged through the flask while it was cooled using an ice bath. 7.81 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the terpolymer (8 g). The composition was determined by proton NMR (benzophenone protons at 6-8.8 ppm) and the molecular weight was determined by Gel Permeation Chromatography ("GPC"). The GPC analysis was performed using both RI and UV techniques. UV GPC indicated the presence of UV active polymer peaks similar to those indicated by the RI detector. This established the incorporation of 4-[2-acryloxyethoxy] benzophenone unit in the terpolymer.

Example 9

Synthesis of Butyl Acrylate (BA) and 1-Octene Copolymer in the Absence of Radical Initiator In a 500 mL 4 necked round bottom flask equipped with a stainless steel stirrer with banana shaped blade, thermometer, cold finger condenser, nitrogen inlet and a cold finger condenser containing dry ice-acetone bath were taken 40 g of toluene and 40 g of 1-octene. The reaction flask was purged with nitrogen while it was cooled using dry ice-o-xylene cooling mixture. 3.66 g of butyl acrylate (BA) was transferred to the reaction flask.

In another separate flask 0.91 g of BA and 2 g toluene were taken in a 100 mL 1 necked round bottom flask. Nitrogen was purged through the flask while it was cooled using an ice bath. 3.9 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (4 g). The composition was determined by proton NMR and the molecular weight was determined by GPC.

By following a similar method, a copolymer of MA and 1-octene was also synthesized in the absence of a free radical initiator.

The polymers were found to have the following data

| Entry | Acrylate | Non-activated Olefin | Mol. Wt. | Acrylate:Octene ratio by $^1$HNMR |
|---|---|---|---|---|
| 1 | n-BA | 1-octene | 242,000 | 50:50 |
| 2 | MA | 1-Octene | 300,000 | 53:47 |

Example 10

Synthesis of Methyl Acrylate/1-Octene Copolymer at Room Temperature

In a 500 mL 4 necked round bottom flask equipped with a stainless steel stirrer with banana shaped blade, thermometer, cold finger condenser, nitrogen inlet and a cold finger condenser containing dry ice-acetone bath were taken 94 g of toluene and 150 g of 1-octene. The reaction flask was purged with nitrogen.

In a separate flask 81 mg of BPO in 23 g of methyl acrylate (MA) was dissolved and transferred to the reaction flask.

In another separate flask 5.75 g of MA and 6 g toluene were taken in a 100 mL 1 necked round bottom flask. Nitrogen was purged through the flask while it was cooled using an ice bath. 36.6 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (44 g). The composition was determined by proton NMR and the molecular weight was determined by GPC.

BA and 1-Octene compositions were also synthesized at room temperature.

Example 11

Synthesis of Methyl Acrylate (MA) and 1-Octene Copolymer in the Absence of Radical Initiator In a 500 mL 4 necked round bottom flask equipped with a stainless steel stirrer with banana shaped blade, thermometer, cold finger condenser, nitrogen inlet and a cold finger condenser containing dry ice-acetone bath were, taken 94 g of toluene and 150 g of 1-octene. The reaction flask was purged with nitrogen while it was cooled using dry ice-o-xylene cooling mixture. 23 g of methyl acrylate (MA) was transferred to the reaction flask.

In another separate flask 5.75 g of MA and 6 g toluene were taken in a 100 mL 1 necked round bottom flask. Nitrogen was purged through the flask while it was cooled using an ice bath. 36.6 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the copolymer (16.5 g). The composition was determined by proton NMR and the molecular weight was determined by GPC.

Example 12

Synthesis of Butyl Acrylate (BA), 4-Allyloxy Benzophenone and 1-Octene Terpolymer Example 8 described the synthesis of a terpolymer where the benzophenone moiety was part of the acrylate unit. Conversely, the terpolymer where the benzophenone moiety is part of the olefin (and not the acrylate) could also be prepared by a similar process where n-BA, 1-octene and 4-allyloxy benzophenone were polymerized at RT as shown below.

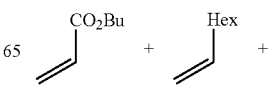

-continued

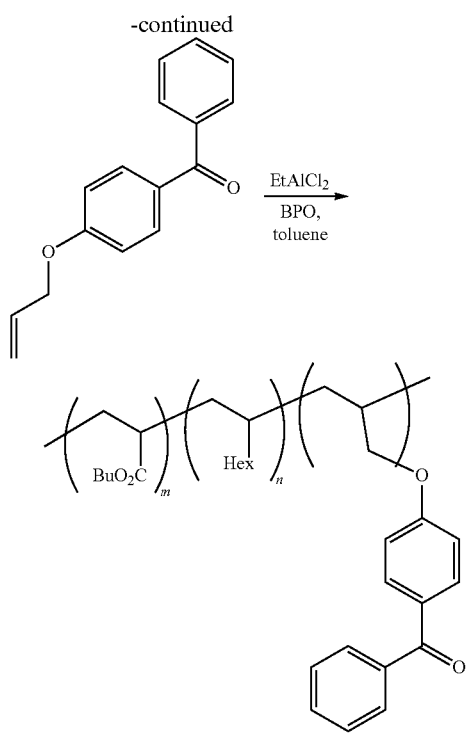

In a 500 mL 4 necked round bottom flask equipped with a stainless steel stirrer with banana shaped blade, thermometer, cold finger condenser, nitrogen inlet and a cold finger condenser containing dry ice-acetone bath were taken 171 g of toluene, 20 g 4-allyloxy benzophenone and 37.5 g of 1-octene. The reaction flask was purged with nitrogen while it was cooled using dry ice-o-xylene cooling mixture.

In a separate flask 0.41 g of BPO in 17 g of butyl acrylate (BA) was dissolved and transferred to the reaction flask.

In another separate flask 4 g of BA and 4 g toluene were taken in a 100 mL 1 necked round bottom flask. Nitrogen was purged through the flask while it was cooled using an ice bath. 18.3 mL of 25 wt % toluene solution of ethyl aluminum dichloride was added to this flask drop wise with occasional swirling. After about 5 minutes, the solution containing the precomplex was transferred to the main reaction flask using a syringe. The mixture was stirred at −40° C. for 8 h and at RT overnight. Next day, the reaction was quenched using 20 g of isopropanol. The mixture was transferred to a separatory funnel, washed several times with water, and dried over anhydrous sodium sulfate. After filtering the solvent was evaporated using rotovap to give the crude terpolymer. The crude terpolymer was purified by precipitating it from methanol. Purified terpolymer (27 g) was obtained. The molecular weight was determined by GPC. $^1$H NMR analysis of the terpolymer after purification clearly showed the incorporation of 5 mol % of benzophenone. Absence of allylic protons in the NMR confirmed that the benzophenone moiety was polymer bound.

What is claimed is:

1. A method of preparing a functionalized polymer with a weight average molecular weight in the range 50,000-3.0 million, wherein said polymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamide, wherein said one or more non-activated olefins constitutes at least 30% of the polymer, said method comprising the steps of:
(a) preparing a solution containing said one or more of activated olefins and said one or more non-activated olefins, optionally in the presence of a solvent;
(b) precomplexing equimolar amounts of said one or more of activated olefins and a Lewis acid to form a mix and adding the mix to the solution in (a) to form a mixture;
(c) optionally adding a radical initiator; and
(d) reacting said mixture at temperatures of from −78° C. to room temperature for a time sufficient to obtain the desired polymer.

2. The method of claim 1, wherein said radical initiator is present.

3. The method of claim 1, wherein said polymer is a copolymer or a terpolymer comprising said activated olefins and said non-activated olefins.

4. The method of claim 1, wherein said terpolymer further comprises one or more crosslinkable functionality.

5. The method of claim 1, wherein the Lewis acid is selected from the group consisting of $EtAlCl_2$, ethyl aluminum sesquichloride, $ZnCl_2$, $AlCl_3$, $AlBr_3$, $BF_3$, $TiCl_4$ and combinations thereof.

6. The method of claim 1, wherein said activated olefin is a (meth)acrylate wherein said (meth)acrylate is represented by the formula $H_2C=C(G)CO_2R_1$, where G may be hydrogen, halogen or alkyl of 1 to 6 carbon atoms, and $R_1$ may be selected from alkyl, cycloalkyl, alkenyl, cycloalkenyl, alkaryl, aralkyl or aryl groups of 1 to 16 carbon atoms, any of which may be optionally substituted or interrupted as the case may be with the moiety selected from the group consisting of silane, silicon, oxygen, halogen, carbonyl, hydroxyl, ester, carboxylic acid, urea, urethane, carbamate, amine, amide, sulfur, sulfonate and sulfone and combinations thereof.

7. The method of claim 1, wherein said non-activated olefin is selected from the group consisting of an unsubstituted alkene, a monosubstituted alkene, a disubstituted alkene and a trisubstituted alkene.

8. The method of claim 6, wherein said (meth)acrylate is selected from the group consisting of methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate, cyclohexyl(meth)acrylate, isobornyl(meth)acrylate, benzyl(meth)acrylate, 2-hydroxy (meth)acrylate, trimethoxybutyl(meth)acrylate, ethylcarbitol(meth)acrylate, phenoxyethyl(meth)acrylate, 2-hydroxyethyl(meth)acrylate, trimethylolpropanetri(meth)acrylate, tetramethylolmethane tetra(meth)acrylate, pentaerythritol hexa(meth)acrylate, pentaerythritol tetra(meth)acrylate, dipentaerythritol monohydroxy penta(meth)acrylate, dipentaerythritol hexa(meth)acrylate, 1,4-butyleneglycol di(meth)acrylate, 1,6-hexanediol di(meth)acrylate, polyethyleneglycol di(meth)acrylate and oligoester(meth)acrylate.

9. The method of claim 7, wherein said non-activated olefin is selected from the group consisting of ethylene, propylene, 1-butene, 1-pentene, 1-hexene, 1-heptene, 1-octene, 1-nonene, 3-methyl-1-butene, isobutylene, diisobutylene, 2-methyl-1-pentene, 3-methyl-1-pentene, 4-methyl-1-pentene, 1,1-dimethylpentene, vinylcyclohexane, cyclopropene, cyclobutene, cyclopentene, cyclohexene, norbornene, limonene, α-pinene, β-pinene, camphene, cis-cyclooctene and trans-cyclooctene.

10. The method of claim 1, wherein said optional solvent, if present, is a hydrocarbon or a halogenated hydrocarbon.

11. The method of claim 10, wherein said hydrocarbon is selected from the group consisting of toluene, xylene, benzene, n-hexane, n-heptane, chlorobenzene, methylene chloride, 1,2-dichloroethane, cyclohexane, methyl cyclohexane and mixtures thereof.

12. The method of claim 2, wherein said radical initiator is a peroxide selected from the group consisting of benzoyl peroxide, methyl ethyl ketone peroxides, di-t-butyl peroxide, di-t-amyl peroxide, dicumyl peroxide, diacyl peroxide, decanoyl peroxide, lauroyl peroxide, peroxydicarbonates, peroxyesters, dialkyl peroxides, hydroperoxide, peroxyketals, 4,4'-azobis(4-cyanovaleric acid), 1,1'-azobis(cyclohexanecarbonitrile), 2,2'-azobisisobutyronitrile ("AIBN"), and mixtures thereof.

13. The method of claim 12, wherein said peroxide is benzoyl peroxide.

14. The method of claim 1, wherein said one or more activated (meth)acrylates is selected from methyl acrylate or n-butyl acrylate, and said one or more non-activated olefins is selected from isobutylene, 1-octene or 2-methylpentene.

15. A method of preparing a polymer with a weight average molecular weight in the range 50,000-3.0 million, wherein said polymer comprises, in its repeat unit, (i) one or more activated olefins independently selected from the group consisting of a (meth)acrylate, acrylonitrile, (meth)acrylamide, maleimide, itaconimide, citroconimide, maleic anhydride, cyanoacrylate, maleate, fumarate, crotonate, alkylidene malonate and cinnamate and (ii) one or more non-activated olefins independently selected from the group consisting of an unsubstituted alkene, monosubstituted alkene, disubstituted alkene, trisubstituted alkene, allyl ether, allyl ester, allyl sulphide and allylamine, wherein said one or more non-activated olefins constitutes at least 30% of the polymer, said method comprising the steps of:
(a) preparing a solution containing said one or more of activated olefins and said one or more non-activated olefins, optionally in the presence of a solvent;
(b) precomplexing equimolar amounts of said one or more of activated olefins and a Lewis acid to form a mix and adding the mix to the solution in (a) to form a mixture;
(c) optionally adding a radical initiator; and
(d) reacting said mixture at temperatures of about −78° C. to about 80° C. for a time sufficient to obtain the desired polymer, wherein said polymer is further reacted such that one or more functionalities are incorporated into the polymer to prepare a functionalized polymer.

16. The method of claim 15, wherein said one or more functionalities are selected from the group consisting of epoxy, carboxylic acid, hydroxy, thiol, amide, oxazoline, acetoacetate, isocyanate, carbamate, amine, amine salt, quaternized amine, thioether, sulfide, sulfonium salt, acetophenone, acyl phosphine oxide, thioxanthone, benzoin ether, benzyl ketal and combinations thereof.

17. The method of claim 1, wherein said polymer comprises at least 50% of said one or more non-activated olefin.

18. A polymer prepared by the method of claim 1.

19. A reaction product prepared by a Lewis acid-catalyzed copolymerization reaction, wherein said product comprises, in its repeat unit, one or more activated olefins and at least 30% content of one or more non-activated olefins, and has a weight average molecular weight in the range 50,000-3.0 million, wherein said one or more activated olefins are independently selected from the group consisting of a (meth)acrylate, acrylonitrile, (meth)acrylamide, maleimide, itaconimide, citroconimide, maleic anhydride, cyanoacrylate, maleate, fumarate, crotonate, cinnamate and alkylidene malonate, and said one or more non-activated olefins are independently selected from the group consisting of an unsubstituted alkene, monosubstituted alkene, disubstituted alkene, trisubstituted alkene, allyl ether, allyl ester, allyl sulfide and allyl amide.

20. A reaction product prepared by a Lewis acid-catalyzed copolymerization reaction, wherein said product comprises, in its repeat unit, one or more activated olefins and at least 30% content of one or more non-activated olefins, and has a weight average molecular weight in the range 50,000-3.0 million, wherein said one or more activated olefins are independently selected from the group consisting of a (meth)acrylate, acrylonitrile, (meth)acrylamide, maleimide, itaconimide, citroconimide, maleic anhydride, cyanoacrylate, maleate, fumarate, crotonate, cinnamate and alkylidene malonate, and said one or more non-activated olefins are independently selected from the group consisting of an unsubstituted alkene, monosubstituted alkene, disubstituted alkene, trisubstituted alkene, allyl ether, allyl ester, allyl sulfide and allyl amide, wherein said reaction product is a terpolymer further comprising one or more crosslinkable functionalities.

21. The reaction product of claim 20, wherein said one or more crosslinkable functionalities are selected from the group consisting of benzophenone, acetophenone, phosphine oxide, thioxanthone, benzoin ether, benzyl ketal, carboxylic acid, hydroxyl, thiol and combinations thereof.

22. A material comprising the reaction product of claim 19.

23. The material of claim 22 being an adhesive, an elastomer, a toughener for a cyanoacrylate and/or epoxy, a polymeric photoinitiator or a personal care product.

24. The reaction product of claim 19, wherein the weight average molecular weight is in the range 500,000-1.5 million.

25. The reaction product of claim 19, wherein the Lewis acid is selected from the group consisting of $EtAlCl_2$, ethyl aluminum sesquichloride, $ZnCl_2$, $AlCl_3$, $AlBr_3$, $BF_3$, $TiCl_4$ and combinations thereof.

26. The reaction product of claim 19, wherein said activated olefin is a (meth)acrylate, wherein said (meth)acrylate is represented by the formula $H_2C\!=\!C(G)CO_2R_1$, where G may be hydrogen, halogen or alkyl of 1 to 6 carbon atoms, and $R_1$ may be selected from alkyl, cycloalkyl, alkenyl, cycloalkenyl, alkaryl, aralkyl or aryl groups of 1 to 16 carbon atoms, any of which may be optionally substituted or interrupted as the case may be with the moiety selected from the group consisting of silane, silicon, oxygen, halogen, carbonyl, hydroxyl, ester, carboxylic acid, urea, urethane, carbamate, amine, amide, sulfur, sulfonate and sulfone and combinations thereof.

27. The reaction product of claim 19, wherein said non-activated olefin is selected from the group consisting of an unsubstituted alkene, a monosubstituted alkene, a disubstituted alkene and a trisubstituted alkene.

28. The method of claim 15, wherein said radical initiator is present.

29. The method of claim 28, wherein said radical initiator is a peroxide selected from the group consisting of benzoyl peroxide, methyl ethyl ketone peroxides, di-t-butyl peroxide, di-t-amyl peroxide, dicumyl peroxide, diacyl peroxide, decanoyl peroxide, lauroyl peroxide, peroxydicarbonates, peroxyesters, dialkyl peroxides, hydroperoxide, peroxyketals, 4,4'-azobis(4-cyanovaleric acid), 1,1'-azobis(cyclohexanecarbonitrile), 2,2'-azobisisobutyronitrile, and combinations thereof.

30. The method of claim 29, wherein said peroxide is benzoyl peroxide.

\* \* \* \* \*